US009436532B1

(12) United States Patent
Chandrasekaran et al.

(10) Patent No.: US 9,436,532 B1
(45) Date of Patent: Sep. 6, 2016

(54) METHOD AND SYSTEM FOR IMPLEMENTING INDEPENDENT MESSAGE QUEUES BY SPECIFIC APPLICATIONS

(75) Inventors: Venkatesan Chandrasekaran, Pleasanton, CA (US); Zhenqiang Fan, San Ramon, CA (US)

(73) Assignee: EMC Corporation, Hopkinton, MA (US)

(*) Notice: Subject to any disclaimer, the term of this patent is extended or adjusted under 35 U.S.C. 154(b) by 284 days.

(21) Appl. No.: 13/331,739

(22) Filed: Dec. 20, 2011

(51) Int. Cl.
*G06F 9/54* (2006.01)

(52) U.S. Cl.
CPC .................................. *G06F 9/546* (2013.01)

(58) Field of Classification Search
CPC ....................................................... G06F 9/546
USPC .......................................................... 719/324
See application file for complete search history.

(56) References Cited

U.S. PATENT DOCUMENTS

| 8,271,996 | B1* | 9/2012 | Gould et al. | 719/312 |
| 2003/0135542 | A1* | 7/2003 | Boudreau | 709/203 |
| 2003/0182464 | A1* | 9/2003 | Hamilton et al. | 709/314 |
| 2006/0053425 | A1* | 3/2006 | Berkman et al. | 719/313 |
| 2010/0058355 | A1* | 3/2010 | Gernaey | 719/313 |

OTHER PUBLICATIONS

Dickman, A., "Designing Applications with MSMQ: message queuing for developers" (1998), Addison-Wesley, pp. 1-144, 281-355.*
Tulach, J., "Practical API Design: Confessions of a Java Framework Architect" (2008), Apress, pp. 145-148.*
Monson-Haefel, R.; Chappell, D.A., "Java Message Service" (2001), O'Reilly & Associates, pp. 1-222.*
IEEE 100, "The Authoritative Dictionary of IEEE Standards Terms," 7th edition (2000), pp. 812.*
Cline, M., "What is 'persistence'? What is a 'persistent object'?" (Jul. 4, 2012), p. 1 [retrieved from http://www.parashift.com/c++-faq/persistence.html].*
Savitch, W., "Absolute Java" (2006), Person Education, Inc., pp. 1114.*
Dickman, A., "Designing Applications with MSMQ: message queuing for developers" (1998), Addison-Wesley, pp. 145-280.*
Redkar, A.; Walzer, C.; Boyd, S.; Costall, R.; Rabold, K.; Redkar, T., "Pro MSMQ: Microsoft Message Queue Programming" (2004), Apress, pp. 211-212.*
Langendoen, K.; Romein, J.; Bhoedjang, R.; Bal, H., "Integrating polling, interrupts, and thread management," (Oct. 1996), Proceedings of Frontiers of Massively Parallel Computing, pp. 13-22,27-31 [retrieved from http://ieeexplore.ieee.org/stamp/stamp.jsp?tp=&arnumber=558057&isnumber=12155].*
Casas, E., "Interrupts" (Published May 3, 2003), pp. 1-8 [retrieved from https://web.archive.org/web/20030530213844/http://www.ece.ubc.ca/~edc/379/lectures/lec4.pdf].*
Gomaa, H., "A Software Design Method for Real-Time Systems" (Sep. 1984), Communications of the ACM, vol. 27, Issue 9, pp. 938-949 [retrieved from http://dl.acm.org/citation.cfm?id=358262].*

* cited by examiner

*Primary Examiner* — Brian W Wathen
(74) *Attorney, Agent, or Firm* — Dergosits & Noah LLP; Todd A. Noah (57) ABSTRACT

A flexible message queue system that creates separate message queues for different applications in a content server is described. The message queue system allows for the dynamic creation of message queues by applications on an as-needed basis, the implementation of a message as a persistent object with a defined schema that facilitates inter and intra-application messaging, and the integration of message creation with notification to streamline the message transaction process among users, such as application threads or applications. Embodiments include a message queue that is implemented in a content server as a persistent object type and that acts on messages that are an object of the type, along with API mechanisms that allow for creating and destroying message queues as needed.

18 Claims, 8 Drawing Sheets

| ATTRIBUTE | TYPE | DESCRIPTION |
| --- | --- | --- |
| msg_creation_time | Date | Time when the message is created. |
| msg_sender | String | User who created the message. |
| msg_recipient | String | The user to which the message is addressed. Default is set to *any* so that anyone can consume the message |
| msg_update_time | Date | Record of the time of the latest state change. |
| msg_state | int | Specifies the message state. A message may be in one of four different states: *ready, acquired,* and *dead.* |
| msg_priority | int | Set by message producer. A greater value means higher priority. |
| msg_expiration_time | Date | A message is considered to be expired and thus can be discarded if it remains in *ready* state by the specified expiration time. |
| msg_acquired_by | String | This attribute is set to an id that uniquely identifies the user/session who acquired the message. This attribute is valid only when the message is in the *acquired* state. |
| msg_redelivery_count | int | This attribute is used for failure-recovery purposes. When a message delivery fails it will be re-tried for a set number of times. |
| msg_error_description | String | When a client fails in processing a message, the acknowledge operation may take a string describes message delivery failed. The failure message will be recorded in this attribute to help trouble shooting. |

| ATTRIBUTE | TYPE | DESCRIPTION |
| --- | --- | --- |
| queue_name | String | Message queue name. This attribute associates a dmc_mq_config object instance with a message queue. Queue name must be unique repository wide. |
| max_redeliveries | integer | Controls how many times a message is re-delivered in case the message delivery fails or is timed out. The default value is 1. |
| retain_dead_msg | Boolean | Controls whether to retain undeliverable messages. Default is false. When the client acknowledges that a message delivery fails, the undelivered message will be set to dead state and remains in the queue if this attribute is true. Otherwise the message is deleted, and thus the failure is ignored. |
| retain_period | integer | How long to retain a dead message before purging it from the queue. |
| expiration_interval | integer | How long a message remains in *ready* state. A message will be automatically purged if it is not acquired in the specified interval. |
| default_priority | integer | The default message priority value. The valid value range is 0-10, and the default is 5. |
| delivery_timeout | integer | The default value is 3600 seconds (one hour). When a message has been acquired for *delivery_timeout* seconds but still has not been acknowledged, it is assumed that the consumer has crashed or is hanging, and the message will be reverted to *ready* state by message service daemon for re-delivery. |
| queue_users | String | Users that are allowed to access the queue. A user in this list is granted permissions defined in the corresponding position in repeating attribute permissions. |
| permissions | integer | Three permissions: produce, consume, and browse are represented as numeric values. The valid values are any of these three values or their combinations. |

| METHODS | DESCRIPTION |
| --- | --- |
| IDfMessage createMessage () | Create a message. |
| void save (IDfMessage msg) | Save the given message to the queue. |
| IDfMessage acquireNext () | Acquires the next available *ready* message with highest priority and earliest creation time, and set the message to *acquired* state. |
| IDfMessage acquireNext (String recipient) | Acquires the next available *ready* message with highest priority and earliest creation time that is addressed to the specified recipient, and set the message to *acquired* state. |
| Collection<IDfMessage> acquireNextBatch (int batchSize) | Acquires the next *batchSize ready* messages. |
| Collection<IDfMessage> acquireNextBatch (String recipient, int batchSize) | Acquires the next *batchSize ready* messages that addressed to the specified recipient. |
| void acknowledge (IDfMessage msg, Boolean success, String description) | Acknowledge to message service that the given message has been processed. The second argument indicates the message process succeeded (true) or failed (false). In case of failure, the third argument optionally provides a description as for why it is failed. In case of success, the message is removed from the queue immediately. |
| void acknowledge (Collection<IDfMessage> msgs, Boolean success, String description) | Batch version of acknowledge(). |
| Collection<IDfMessage> get (String predicate); | Returns as a collection all the messages that satisfy the specified DQL predicate. |
| IDfMessage get (IDfId msgId); | Returns the message object for the given message object ID. |
| Collection<IDfMessage> get (int state); | Returns all the messages in specified state. |
| int purge (int state) | Purges all the messages in the given state from the queue. |
| int purge (IDfId msgId) | Purges the specified message from the queue. |
| int purgeAll() | Purges all the messages from the queue regardless of state. |
| int getCount (String predicate) | Return the number of the messages that satisfy the specified DQL predicate. |
| int getCount(int state) | Return the number of the messages in the given state. |
| IDfMessageQueueConfig getConfig() | Return the message queue configuration object. |

| METHOD | DESCRIPTION |
|---|---|
| void setMaxRedeliveries (int count) throws DfException; | Set property max_redeliveries. |
| void setRetainDeadMessage (boolean value) throws DfException; | Set property retain_dead_message. |
| void setRetainPeriod (int period) throws DfException; | Set property retain_period. |
| void setExpirationInterval (int interval) throws DfException; | Set property expiration_interval. |
| void setDefaultPriority (int priority) throws DfException; | Set property default_priority. |
| void setDeliveryTimeout (int timeout) throws DfException; | Set property delivery_timeout. |
| String getQueueName () throws DfException; | Returns the value of property queue_name. |
| int getMaxRedeliveries () throws DfException; | Returns the value of property max_redeliveries. |
| boolean getRetainDeadMessage () throws DfException; | Returns the value of property retain_message_message. |
| int getRetainPeriod () throws DfException; | Returns the value of property retain_period. |
| int getExpirationInterval () throws DfException; | Returns the value of property expiration_interval. |
| int getDefaultPriority () throws DfException; | Returns the value of property default_priority. |
| int getDeliveryTimeout () throws DfException; | Returns the value of property delivery_timeout. |
| void grant (String userName, int permission) throws DfException; | Grant the given user the specified permission. |
| void revoke (String userName, int permission) throws DfException; | Revoke the specified permission from the given user. |
| boolean canProduce (String userName, int permission) throws DfException; | Return <code>true</code> if the user has permission to add messages to the queue, <code>false</code> otherwise. |
| boolean canConsume (String userName, int permission) throws DfException; | Return <code>true</code> if the user has permission to consume messages of the queue, <code>false</code> otherwise. |
| boolean canBrowse (String userName, int permission) throws DfException; | Return <code>true</code> if the user has permission to browse the queue, <code>false</code> otherwise. |
| boolean isOwner (String userName, int permission) throws DfException; | Return <code>true</code> if the user is the owner of the queue, <code>false</code> otherwise. |
| void save() | Save the configuration properties to the database. Owner, sysadmin, or superuser privileges are required to save message configuration object |

| METHOD | DESCRIPTION |
|---|---|
| IDfTime getCreationTime() | Returns message creation time. |
| IDfTime getUpdateTime() | Returns the last time the message was updated |
| int getState() | Gets message state. |
| void setState(int state) | Sets message state. |
| int getPriority() | Gets message priority. |
| void setPriority(int value) | Sets message priority. |
| int getExpirationTime() | Gets message expiration time. |
| void setExpirationTime(IDfTime time) | Sets message expiration time. |
| String getAcquiredBy() | Gets the value of 'msg_acquired_by' property. |
| void setAcquiredBy(String name) | Sets 'msg_acquired_by' property. |
| String getSender() | Gets message sender |
| Void setSender(String sender) | Sets message sender |
| String getRecipient() | Gets message recipient |
| void setRecipient(String recipient) | Sets message recipient |
| int getRedeliveryCount() | Gets the value of attribute 'msg_redelivery_count' |
| void setRedeliveryCount(int count) | Sets the value of attribute 'msg_redelivery_count' |
| String getErrorDescription() | Gets error message stored in attribute 'msg_error_description'. This applies only when the message delivery fails. |
| void setErrorDescription description) | Set a text description in attribute 'msg_error_description' as for why the message delivery failed. |
| IDfId getMessageId() | Return the message object id. |

| METHODS | DESCRIPTION |
| --- | --- |
| IDfAttr createAttribute(String name, boolean repeating, int type, int length) | Create a message queue attribute that implements interface IDfAttr. |
| IDfAttr createAttribute(String name, boolean repeating, int type) | Used for non-string attributes. |
| void destroyMessageQueue(String qName) | Destroys the specified the message queue. Destroying a message queue is equivalent to dropping the corresponding type and the dmc_mq_config object. The function will fail if the queue is not empty. Owner, sysadmin, or superuser privileges are required to call this method. |
| IDfMessageQueue getMessageQueue(String qName) | Return message queue object representing specified message queue. Throw DfException if the specified queue does not exist. |
| Collection<String> getAllMessageQueueNames() | Return as a list all message queue names s in the repository. |

FIG. 9

METHOD AND SYSTEM FOR IMPLEMENTING INDEPENDENT MESSAGE QUEUES BY SPECIFIC APPLICATIONS

BACKGROUND

Message queues are software components that provide an asynchronous communications protocol for applications and interprocess or inter-thread communication. Message queues provide an asynchronous communications protocol in that the sender and receiver do not need to interact with the message queue at the same time. In a typical message queue implementation, a system administrator installs and configures a commercially available message queue manager and defines a named message queue. An application registers a software routine that listens for messages placed in the queue, and other applications may then connect to the queue and transfer messages onto it. The queue manager stores the messages until a receiving application connects and calls the registered software routine. The message can then be processed by the receiving application.

The efficient processing of messages is critical in enterprise software systems and cloud computing platforms that utilize content servers for electronic record management and management of real-time activities and information, such as in business activity monitoring (BAM) and business process management (BPM) solutions. In most current systems, a single message queue, or message service, such as Java Message service is created and used by different applications. This creates a significant message processing bottleneck and limits the flexibility of message processing.

There are several well-established use cases of message queues in a content server, such as a workflow task queue, fulltext index task queue, and business process execution monitoring. For the workflow task queue, a queue table is created to support workflow/router functionality. As a workflow executes, some tasks become ready for execution and are entered to this queue. The designated performer of the task acquires and executes the task, and brings the workflow execution to the next state. For fulltext indexing, the content server does full-text indexing asynchronously. When an object is created, updated, or destroyed, the content server generates a fulltext indexing request and adds the request to a queue. The fulltext index agent retrieves the request from the queue and calls the indexing server to update the fulltext indexes accordingly. In the BAM context, to monitor business process execution status, various events about business process activities must be recorded and then extracted by the BAM server into an integration table for further format and aggregation processing. Each of these use cases, among others, present certain issues with regard to current single message queue systems. In general, sharing a message queue by multiple features presents performance disadvantages. The workflow task queue is a hot spot in the system because of frequent add/delete to/from actions in the queue. For example, a workflow task execution causes frequent updates to set the task state, and updates to individual tasks are done on a one-by-one basis. The same is true for handling fulltext indexing tasks. As the task queue size grows, queries and updates on the queue will slow down because of various indexes defined over the queue table. This is especially true in some special cases, such as when many fulltext indexing requests are generated, while the index agent is not able to consume at a consistent rate to keep the queue at a manageable size.

Another issue with the existing queuing mechanisms is that the message schema is generally fixed. That is, message schemas are specifically defined for specific workflows and cannot be used for other purposes in general. Present message queue systems also suffer from transactional limitations in that they use polling to find available index requests, which presents an intrinsic problem of controlling the polling interval. Frequent polling causes unnecessary system resource consumption while overly long polling intervals result in unacceptable latency.

The issues associated with present message queue systems are generally caused by the content servers not providing a general message queue mechanism that different applications can use to create and manage their own queues. Although the Java Messaging System may provide the possibility of using message services provided by third-party providers, using such external message services may not meet the performance requirements of the use cases in content server environment as listed above. In addition, using JMS introduces additional deployment and administration complexity. For example, transaction management can also be problematic in that two phase commit (2PC) protocols may be needed when using third party message services.

What is needed, therefore, is a generic and flexible message queue mechanism that allows applications to create and manage their own message queues. What is further needed is a message queue system that eliminates unnecessary polling by providing a notification mechanism such that a message consumer will be blocked when there are no pending messages available in the queue, and the blocked message consumer is notified as soon as a message becomes available.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 5 is a table that lists the attributes of the message queue configuration object, under an embodiment.

FIG. 6 is a table that lists the methods of IDfMessageQueue, under an example embodiment.

FIG. 7 is a table that lists the methods of the IDFMessageQueueConfig, under an example embodiment.

DETAILED DESCRIPTION

The subject matter presented herein provides a message queue system that creates separate message queues for different applications in content server and other computing environments. The message queue system allows for the dynamic creation of message queues by applications on an as-needed basis, the implementation of a message as a persistent object with a defined schema that facilitates inter and intra-application messaging, and the integration of message creation with notification to streamline the message transaction process among users (i.e., application threads or applications). Embodiments include a message queue that is implemented in a content server as a persistent object type and that acts on messages that are an object of the type, along with API (application program interface) mechanisms that allow for creating and destroying message queues as needed.

Figure 1:
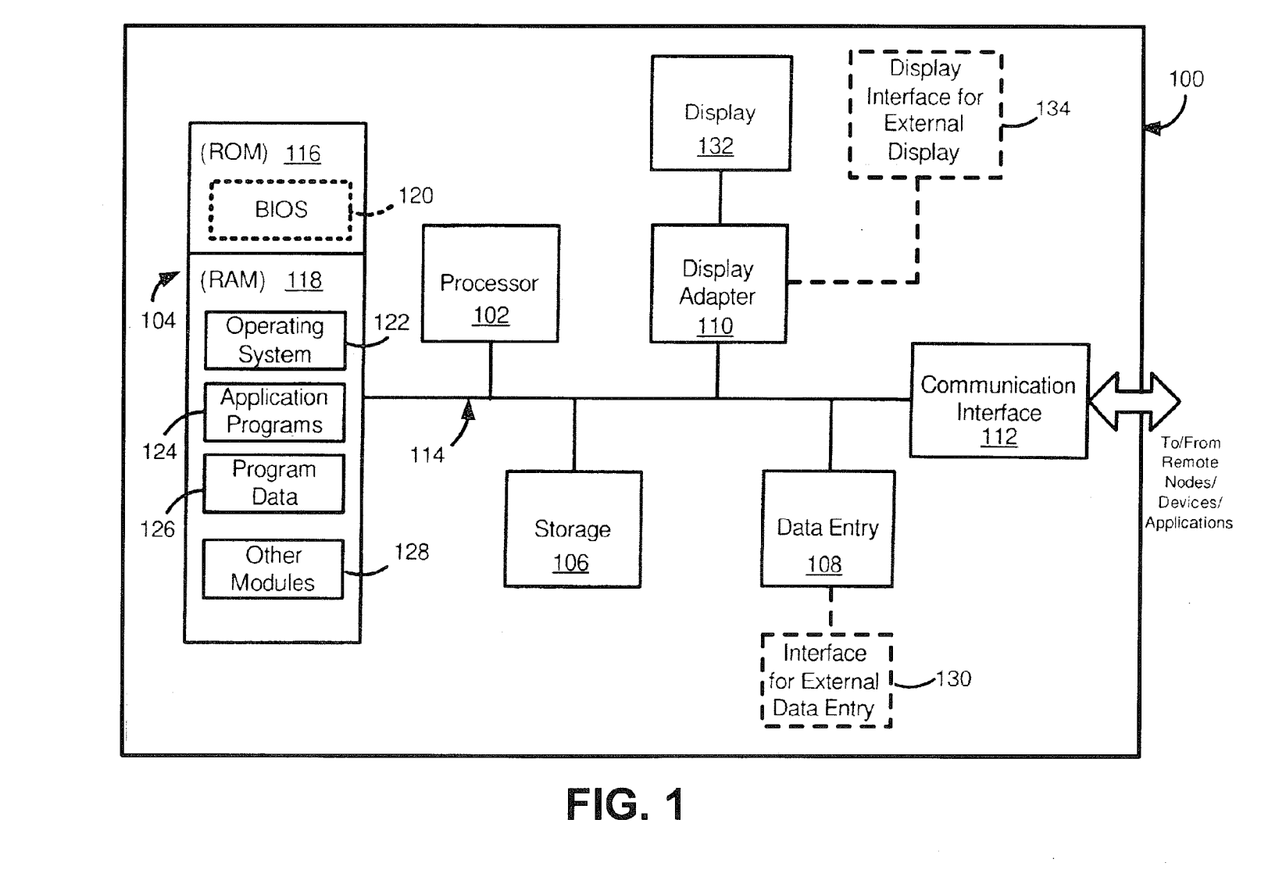
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

In an embodiment, the computer system 100 includes one or more methods of implementing a message queue mechanism to allow an application to create message queues suited for its specific need. The overall system allows for the creation of separate queues for different applications to avoid using the single queue for multiple purposes. Such a system provides for the following: allowing an application to drop a message queue when it is no longer needed; supporting operations for adding, acquiring, updating, and removing messages; supporting batch processing mode for message add/acquire and other operations, maintaining messages as always persisted, such that when a message is generated and added to a queue, it is always stored in database and a message is removed from the queue only after the consumer has acknowledged that the message has been consumed. Such a system also provides that when a message is created within an explicit user transaction, the message persistence takes place together with user data when commit( ) is invoked by the application. If a message is created without an explicit user transaction open, message data are committed immediately before the message add API returns. Moreover, a message is consumed by a single client only, so that a message will be processed (or acquired) once only; for example, if there are ten or more queued messages in queue Q and both client A and client B invoke Q, one of the clients will get messages 1-5 and the other will 6-10 respectively. In this system, a message can be assigned a priority and the message with the highest priority is always consumed first. When there are multiple messages with the same priority, the one that is created earliest is consumed first. A message is removed from the queue only after the consumer has acknowledged that the message has been successfully processed. The message queue system supports non-blocking message acquisition modes only because there are no use cases for blocking message acquisition. In non-blocking mode, acquisition operation returns immediately if there are no ready messages available. In blocking message acquisition mode, operation for acquiring a message may be blocked if there are no pending messages. When a message becomes available later, the blocked consumer is notified of the availability of message and will continue. The system also allows multiple sessions to add/acquire messages to/from the same queue concurrently. Message service APIs are made to be multithread-safe.

Figure 2:
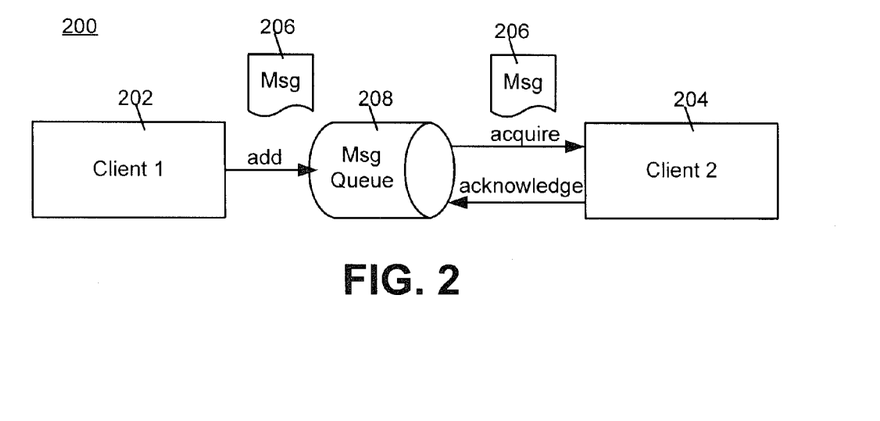
FIG. 2 illustrates the basic architecture of a flexible messaging service using a message queue, under an embodiment.

FIG. 2 illustrates the basic architecture of a flexible messaging service using a message queue, under an embodiment. System 200 two message clients 202 and 204 respectively denoted client 1 and client 2. The clients can act as message producers or message consumers with respect to any single message. For the example of FIG. 2, client 1 is a message producer and client 2 is a message consumer of message 206. The clients exchange messages, such as message 206 through message queue 208. The flexible messaging service provides an application programming interface to allow each respective application to define a distinct message schema to be used by its respective clients. A message producer (client 1) uses the message service programming API to send (add) a message to the message queue 208. A consumer (client 2) uses the message service programming API to receive (acquire) messages for processing. For flexible messaging service, under an embodiment, message queue 208 represents a message queue that is created and destroyed on an as-needed basis by individual applications within a suite, or individual thread processes within an application.

In the context of message queue system 200, a message goes through the following steps from generation to disposal: (1) the producer creates a message and adds it to the message queue; (2) the message consumer acquires the message; (3) the message consumer processes the message; and (4) the message consumer acknowledges that the message has been processed (succeed or fail). The message is deleted from the queue if the message has been successfully processed (succeed). The message may be retained for trouble shooting or retry in case the message processing failed.

Figure 3:
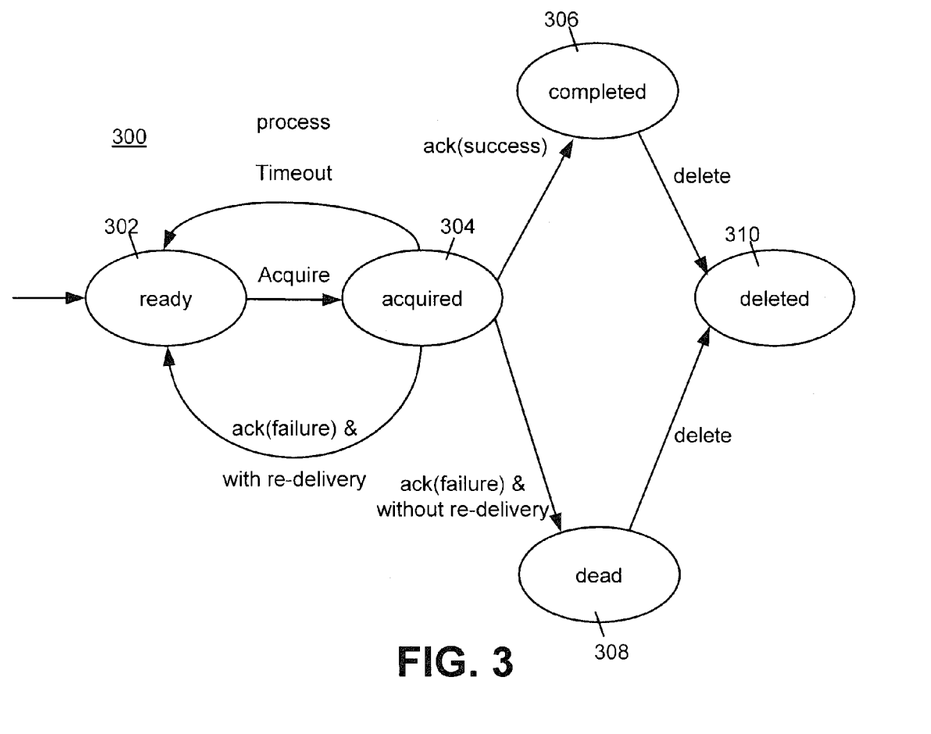
FIG. 3 is a flow diagram that illustrates a process of message state transitions for a message queue system, under an embodiment.

As the message is processed by the system, it goes through several state changes. FIG. 3 illustrates a process of message state transitions for a message queue system, under an embodiment. A message is in ready state when it is initially created. Only messages in ready state can be acquired. The message in ready state is set to acquired state when it is acquired by a client. Then the message is deleted after the client has acknowledged that the message has been successfully processed, the message is set to dead state otherwise. As shown in flow diagram 300, when a message is created and added to the queue, it is in ready state 302. When a message in ready state 302 is acquired by a client for processing, its state is set to acquired 304. After having finished processing the message, the message consumer client acknowledges that the message has been successfully processed and set its state to completed 306. A message in completed state 306 will be removed from the queue immediately, as shown in deleted state 310. If the client acknowledges that the message processing has failed, and the message has not exceeded the retry limit, the message will be reset to ready state 302 for re-delivery. If message processing has failed and the retry limit is exceeded, the message state is set to dead 308, and it is removed from the queue, as shown in deleted state 310. A dead message may be retained in the queue for trouble shooting, and a failed message may be deleted from the queue immediately as soon it is acknowledged. Dead messages will eventually be purged either manually or by a message service daemon process.

In an embodiment, a message consists of a number of attributes of primitive types. Alternatively, the message may be defined as an XML document, which is stored as pure ASCII text. Implementing a message as an XML document allows users to define more flexible message structure, but certain relational database management systems may have a limitation on the maximum size of attribute, and so implementations may need to accommodate such limits.

Figure 4:
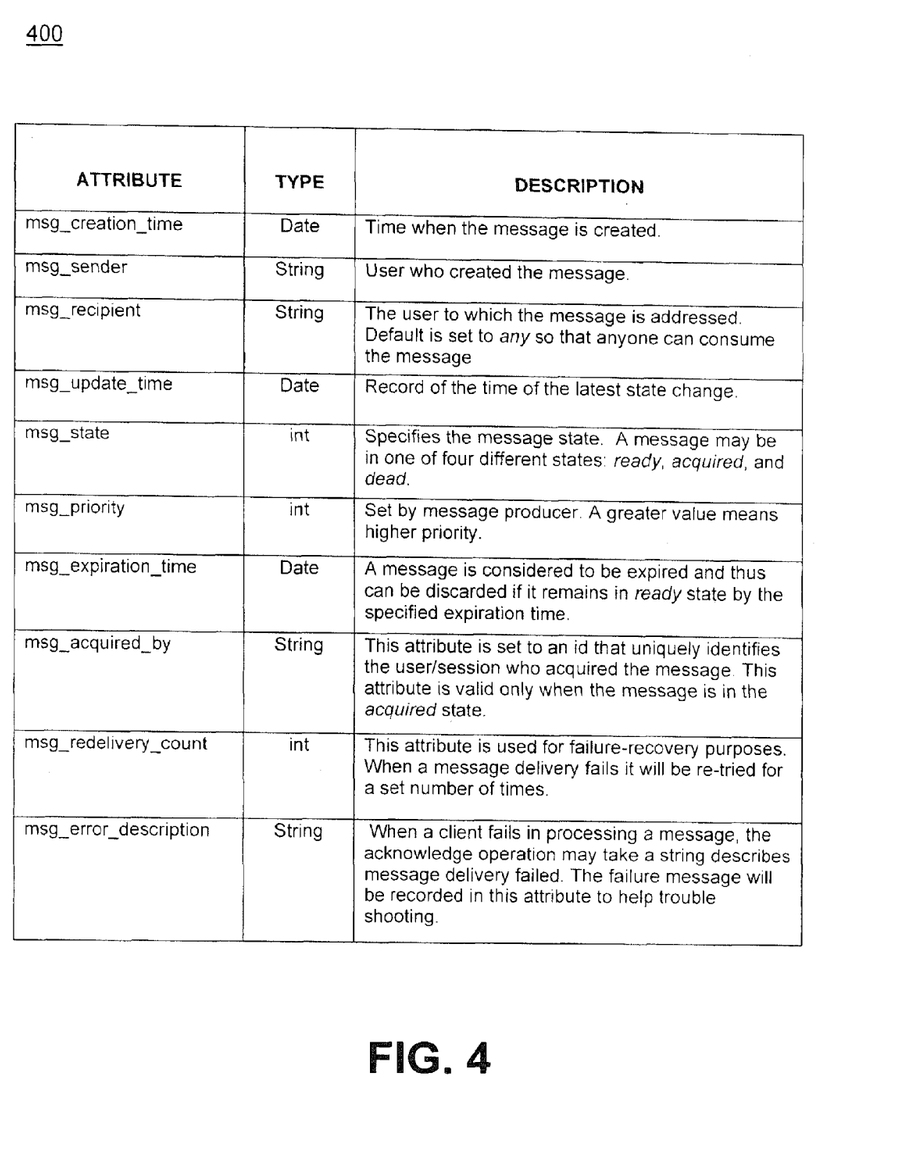
FIG. 4 is a table that lists the internal message queue attributes, under an embodiment.

In an embodiment, a message queue 208 is implemented in a content server as a persistent object type. A message may simply be an object of the type. A message queue has the following attributes: (1) attributes inherited from a persistent object, (2) attributes defined by an application and specified as API arguments when a message queue is created; and (3) internal attributes, which are attributes that exist for every message queue. FIG. 4 is a table 400 that lists the internal message queue attributes, under an embodiment.

In general, all messages added to a queue by a single session are guaranteed to be acquired in the order they were created, as specified by the msg_creation_time attribute. If they are assigned different priorities, higher priority messages are always acquired first. For messages with the same priority, the ones with the earlier creation time are acquired first. Messages added by different sessions, however, may not always be in the order of their creation time because of concurrency or delay within individual session threads. In overall processing, the ordering of messages consumed by a client usually has only a rough relationship to the order in which they were produced.

In an embodiment, the message queue is created on an as-needed by an application. A configuration object (e.g., dmc_mq_config) is used to store message queue configuration properties. The message queue (mq) configuration object is derived directly from the system object (SysObject) and has certain inherent attributes. FIG. 5 is a table 500 that lists the attributes of the message queue configuration object, under an embodiment. The message queue object instance is created when a message queue is created. The attribute object_name (inherited from SysObject) is also set to the name of the message queue. The configuration object is destroyed when the message queue is dropped.

In an embodiment, the message service is implemented through one or more APIs. The message queue mechanism has certain functional characteristics. A message is implemented as a persistent object, and it is the responsibility of application to know which message attributes to set and set them appropriately after a message object is created. APIs are provided for the following tasks: create message queue (DFC and DQL); destroy message queue (DFC and DQL); create a message; set message attributes (which attributes to set is the application's responsibility; add messages to a queue; acquire messages from a queue; update the message state; purge messages from a queue; browse messages in a queue; list all message queues; set message queue configuration properties; and query message queue metrics.

In an embodiment, certain message queue security measures are implemented. For example, the user who creates a message queue is the owner of the message queue. creating message queue requires 'create type' privilege; thus, any users who needs to create message queues must be granted 'create type' privilege. This can be done using DQL grant/revoke statements. A message queue is virtually created as a type without super type. Superuser privilege may be required to create a type without super type. The owner, sysadmin, or superuser privileges are required to administrate message queue, including updating dmc_mq_config object, granting/revoking queue access permissions, purging messages from queue, deleting message queue. Certain permissions may be defined for a message queue. These include: (1) produce allow adding messages to the message queue; consume—allow acquiring messages from the message queue; browse—allow browsing messages in the message queue. Though a user with browse permission is allowed to query message queue, it is not allowed to add, delete, or update messages through DQL.

In an embodiment, a message service daemon (process/thread) is created and runs as internal session for performing the certain house-keeping tasks apart from normal message service operations, such as failure handling. For example, if a client crashes or hangs after having acquired a message but before completing processing the message, the message will remain in acquired state forever. To handle this failure scenario, message server will periodically check if there are any messages that have been acquired for a long time but have not been acknowledged. If yes, it assumes that the message consumer has either crashed or hung, and will reset these acquired messages to ready state. The message service also periodically checks messages that have expired and discards them to keep storage consumption at a minimum. Dead messages are also periodically purged from the message queue.

In an embodiment, the message queue service includes mechanisms to track certain queue metrics, which may include the following: the number of messages in a queue; the average number of messages in queue since server was last restarted; the peak number of messages in queue since server was last restarted; the total number of messages that have been added to queue since server was last restarted; the total number of messages that have been deleted from queue since server was last restarted; the total number messages that failed; the average message waiting time in queue; the maximum message waiting time in queue; and the number of messages that expired since server was last restarted. These metrics can be dynamically maintained in memory and will reset every time the content server is restarted.

In the case that the message server is hosted by a content server, any message service related errors, information, warning, or trace messages will go to the content server log. In an embodiment, the system includes a separate log for each messages queue. The content server can then point to the message queue specific log. When implemented in a content server, certain event subscription mechanisms may need to be added or changed to utilize the flexible message queue mechanism. In general, a content server defines two types of events: (1) notification events and (2) audit events. In an example of a specific implementation, an event subscription is represented as an object of type dmi_registry. The two different event types are differentiated by the value of attribute dmi_registry.is_audittrail. A Notification event is generated as an object of type dmi_queue_item, while an audit event is generated as an object of type dm_audittrail.

With the flexible message queue mechanism, different message queues can be created for notification events generated by different applications, instead of putting all the notification events in table dmi_queue_item. This requires adding one additional attribute 'destination_queue' to type dmi_registry to indicate to which message queue to deliver a notification event. Certain changes to event subscription APIs may also need to be made. For example, the commands register and audit, and the related APIs for event registration in certain interfaces (e.g., PersistentObject and AuditTrailManager) should be updated accordingly to take destination queue information into consideration. Event generation functions in the content server must be made aware of the destination queue of the event and deliver generated events to their designated queues.

In general, content servers generate one event for each subscription. When two or more users subscribe to the same event, each user will have its own subscription and the content server will generate one event for each of these subscriptions. In an embodiment, this situation will remain the same with multiple message queues for a plurality of applications.

In an embodiment, the flexible message queue is implemented as part of an enterprise content management platform, such as the Documentum platform provided by EMC Corp. These platforms provide management capabilities for all types of content including business documents, photos, video, medical images, e-mail, Web pages, fixed content, XML-tagged documents, and so on. They are built around a repository in which the content is stored securely under compliance rules. This repository appears as a unified environment, although content may reside on multiple servers and physical storage devices within a distributed environment. In general, Documentum functionality is available through a variety of user interfaces and through application programming interfaces (APIs).

For an embodiment in which the flexible message queue is implemented in a Documentum system, a Java interface, IDfMessageQueue is defined in a DFC package for the message queue. The class DfMessageQueue implements IDfMessageQueue. An instance of class DfMessageQueue uniquely indentifies a message queue in a Documentum repository. FIG. 6 is a table 600 that lists all the methods of IDfMessageQueue, under an example embodiment.

Certain configuration properties are defined for a message queue. These include: queue_name, redelivery_count, retain_dead_msg, retain_period, expiration_ interval, default_priority, and delivery_timeout. Table 500 of FIG. 5 provides the description of these properties. Certain set/get configuration properties are required to save the object to the database. FIG. 7 is a table 700 that lists the methods of the IDFMessageQueueConfig, under an example embodiment.

Figure 8:
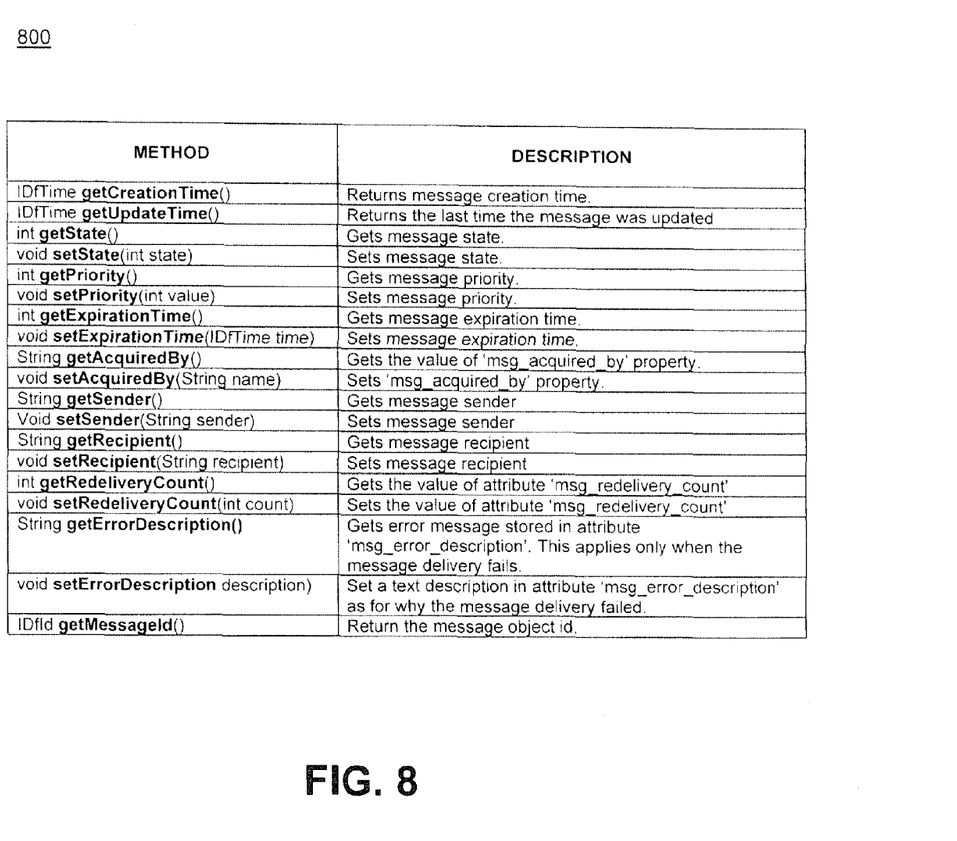
FIG. 8 is a table that lists the methods of the IDFMessage, under an example embodiment.

In an embodiment, the interface IDFMessage is defined for setting/getting message properties (internal attributes) as well as message data attributes (application defined). FIG. 8 is a table 800 that lists the methods of the IDfMessage, under an example embodiment. An interface IDfMessageQueueFactory for creating a message queue can be implemented through a class DfMessageQueueFactory. An application can call the static method DfMessageQueueFactory.getInstance( ) to get a DfMessageQueueFactory instance. In an example implementation, the method idfMessageQueue is defined as follows:

idfMessageQueue createMessageQueue (IDfSession session, String Name, Collection <Attribute> attrs).
This method would create a message queue with the given name, i.e. creating an object type with name dmc_mq_<qName>. The third argument specifies all the attributes of the message queue. 'Create type' privilege is required to call this method. Creating a message queue will also causes a dmc_mq_config object to be created implicitly. Once the message queue is created, one can update the configuration properties either through APIs defined in IDfMessageQueueConfig.

Figure 9:
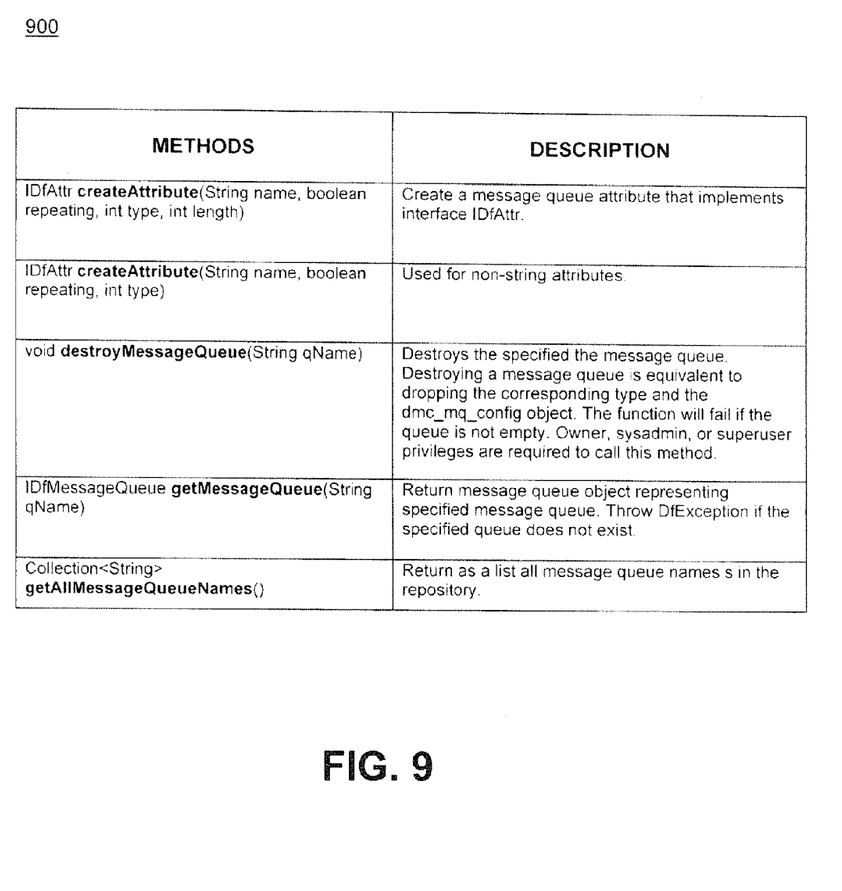
FIG. 9 is a table that lists the methods of IDFMessageQueueManager, under an example embodiment.

In an embodiment, an interface IDfMessageQueueManager is defined for creating attribute objects that are needed in creating a message queue, destroying/instantiating the message queue for the given queue name, and listing all message queues. FIG. 9 is a table 900 that lists all the methods of IDfMessageQueueManager, under an example embodiment.

In an embodiment, certain. DQL (doctrine query language) statements are provided for creating/destroying message queue. Example statements include:

CREATE MESSAGE_QUEUE queue_name[(property_def{,property_def})]
DROP MESSAGE_QUEUE queue_name
Executing the CREATE MESSAGE_QUEUE statement causes an object type with name dmc_mq_<queue_name> to be created. Creating a message queue also causes a dmc_mq_config object to be created with object_name set to the queue name. Executing the DROP MESSAGE_QUEUE statement causes type dmc_mq_<queue_name> to be dropped and the corresponding dmc_mq_config object to be destroyed. The following DQL statements can optionally be supported for managing message queue security:
GRANT <privilege_list> ON MESSAGE_QUEUE <mq_name> TO <user_list>
REVOKE <privilege_list> ON MESSAGE_QUEUE FROM <user_list>
Where <user_list> is docbase user or group names separated with comma while <privilege_list> is any combination of 'produce', 'consume', and 'browse' separated with comma.

In an alternative embodiment, the flexible message queue system can implement a message as a registered table instead of a persistent object type to avoid including inherent attributes from persistent type. Certain mechanisms may need to be implemented to overcome certain drawbacks, however, such as handling repeating attributes, and leveraging existing code for dealing with reading/writing message object from/to database. Additionally, a queue administrator may be appointed to perform administrative operations on the queue. Such a queue administrator may be defined as an attribute of the dm_mq-config object (as opposed to Sysadmin or superuser). A message service daemon can also run as the queue administrator for performing message queue house keeping tasks.

Through the appropriate API interfaces, the flexible message queue system is configured to allow different applications to create/destroy message queues on-the-fly as needed, and allows for the creation of different queues for different applications. An application can define a message schema to fit its specific needs, instead of having multiple applications share a fixed message schema. An application can define a distinct message schema to be used by its respective processes. The flexible message queue system also allows message persistence to be transactional with other application data, thus making 2PC protocols unnecessary.

The flexible message queue further allows multiple users to add or acquire messages to and from the same queue concurrently. Messages can be assigned a priority for hierarchical processing, and failed messages can be retried for a defined number of times. When a message is created with an explicit user transaction, the message persistence takes place together with the user data. If a message is created without an explicit user transaction open, message data is committed immediately. A simple access control mechanism is provided to control who is allowed to add messages to the queue, acquire messages from the queue, and browse messages in the queue.

In general, the flexible message queue system should be able to support a large number of concurrent sessions, such as expected event generation rate is at least 600 events per second per queue at peak time. There should be near zero latency for adding/acquiring a message to/from queue, near zero latency for most queue management operations, and deleting messages from the queue should have minimum impact on other queue operations.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method for processing messages in a content server platform, comprising:
   providing an application programming interface to a content management system of the content server, the content server including a plurality of applications and defining two different event types, the event types including notification events for the content server, the notification events having subscriber applications;
   creating, by the application programming interface, at least one message queue for each of the plurality of applications for the processing of messages among client processes within each respective application of the plurality of applications, wherein each message queue is implemented in the content server as a persistent object type, wherein messages in a message queue are objects of the persistent object type corresponding to the message queue, objects of a persistent object type being maintained as always persisted, such that, when a message is generated and added to a queue, the message is stored in a database, the message being removed from the message queue only after a message consumer client process has acknowledged that the message has been consumed, the messages of the persistent object type only being consumed by client processes of the application for which each message queue was created; and
   creating, by the application programming interface, different message queues for notification events generated by different applications of the plurality of applications within the content server.

2. The method of claim 1 wherein the message queue is used by a message producer and the message consumer for any message placed in the message queue, and wherein the message producer uses a message service application programming interface to add a message to the message queue for transmission to the message consumer.

3. The method of claim 2 wherein the message consumer uses the message service application programming interface to acquire the message in the message queue for processing.

4. The method of claim 3 wherein the message consumer acknowledges that the message has been processed after acquiring the message in the message queue.

5. The method of 2 further comprising assigning a state status to the message as it is processed through the message queue by the message producer and message consumer.

6. The method of claim 5 wherein the message is placed in a ready state when it is initially created by the message producer, and the message state is set to an acquired state when it is acquired by the message consumer.

7. The method of claim 6 wherein the message is set to a completed state and eventually deleted after the message consumer has acknowledged that the message has been successfully processed, and wherein the message is set to a dead state if it is not successfully processed.

8. The method of claim 7 further comprising assigning a priority to the message to dictate an order of processing relative to other messages transmitted through the message queue.

9. A computer program product, comprising a non-transitory computer-readable medium having a computer-readable program code embodied therein, the computer-readable program code adapted to be executed by one or more processors to implement a method for processing messages in a content server platform, the method comprising:
provide a first application programming interface to a content management system of the content server, the content server including a plurality of applications and defining two different event types, the event types including notification events for the content server;
creating, by the application programming interface, at least one message queue for each of the plurality of applications for the processing of messages among client processes within each respective application of the plurality of applications, wherein each message queue is implemented in the content server as a persistent object type, wherein messages in a message queue are objects of the persistent object type corresponding to the message queue, objects of a persistent object type being maintained as always persisted, such that, when a message is generated and added to a queue, the message is stored in a database, the message being removed from the message queue only after a message consumer client process has acknowledged that the message has been consumed, the messages of the persistent object type only being consumed by client processes of the application for which each message queue was created; and
creating, by the application programming interface, different message queues for notification events generated by different applications of the plurality of applications within the content server.

10. A system for processing messages in a content server platform, comprising:
a processor-based content management system executed on the content server computer that is configured to support execution of a plurality of applications and define two different event types, the event types including notification events for the content server, the notification events having subscriber applications;
a first application programming interface component to the content management system of the content server, the content server including a plurality of applications, the application programming interface being configured to:
create at least one message queue for each of the plurality of applications for the processing of messages among client processes within each respective application of the plurality of applications, wherein each message queue is implemented in the content server as a persistent object type, wherein messages are objects of the persistent object type corresponding to the message queue, objects of a persistent object type being maintained as always persisted, such that, when a message is generated and added to a queue, the message is stored in a database, the message being removed from the message queue only after a message consumer client process has acknowledged that the message has been consumed, the messages of the persistent object type only being consumed by client processes of the application for which each message queue was created; and
create different message queues for notification events generated by different applications of the plurality of applications within the content server.

11. The system of claim 10 further comprising an interface coupling a message producer to the message consumer, each embodied as a client process, and wherein the message queue is used by the message producer and the message consumer for any message placed in the message queue.

12. The system of claim 11 further comprising a message service application programming interface component, wherein the message producer uses a message service application program interface to add a message to the message queue for transmission to the message consumer, and wherein the message consumer uses the message service application programming interface to acquire the message in the message queue for processing.

13. The system of claim 12 wherein the message consumer acknowledges that the message has been processed after acquiring the message in the message queue.

14. The system of 12 further comprising a process component configured to assign a state status to the message as it is processed through the message queue by the message producer and message consumer.

15. The system of claim 14 wherein the message is placed in a ready state when it is initially created by the message producer, and the message state is set to an acquired state when it is acquired by the message consumer.

16. The system of claim 15 wherein the message is set to a completed state and eventually deleted after the message consumer has acknowledged that the message has been successfully processed, and wherein the message is set to a dead state if it is not successfully processed.

17. The system of claim 16 further comprising a prioritization module configured to assign a priority to the message to dictate an order of processing relative to other messages transmitted through the message queue.

18. A computer program product, comprising a non-transitory computer-readable medium having a computer-readable program code embodied therein, the computer-readable program code adapted to be executed by one or more processors to implement a method for processing messages in a content server platform, the method comprising:
providing a first application programming interface to a content management system of the content server, the content server including a plurality of applications;
creating, by the application programming interface, at least one message queue for each of the plurality of applications for the processing of messages among client processes within each respective application of the plurality of applications, wherein each message queue is implemented in the content server as a persistent object type, wherein messages in a message queue are objects of the persistent object type corresponding to the message queue, objects of a persistent object type being maintained as always persisted, such that, when a message is generated and added to a queue, the message is stored in a database, the message being removed from the message queue only after a message consumer client process has acknowledged that the message has been consumed, the messages of the persistent object type only being consumed by client processes of the application for which each message queue was created; and creating, by the application programming interface, a separate content server log on the content server for each created message queue, each separate content server log including message service-related information pertaining to a corresponding created message queue.

* * * * *